May 12, 1925.
J. L. OEFINGER
1,537,780
ATTACHING BRACKET FOR LIGHTING FIXTURES
Filed Dec. 8, 1923   2 Sheets-Sheet 2
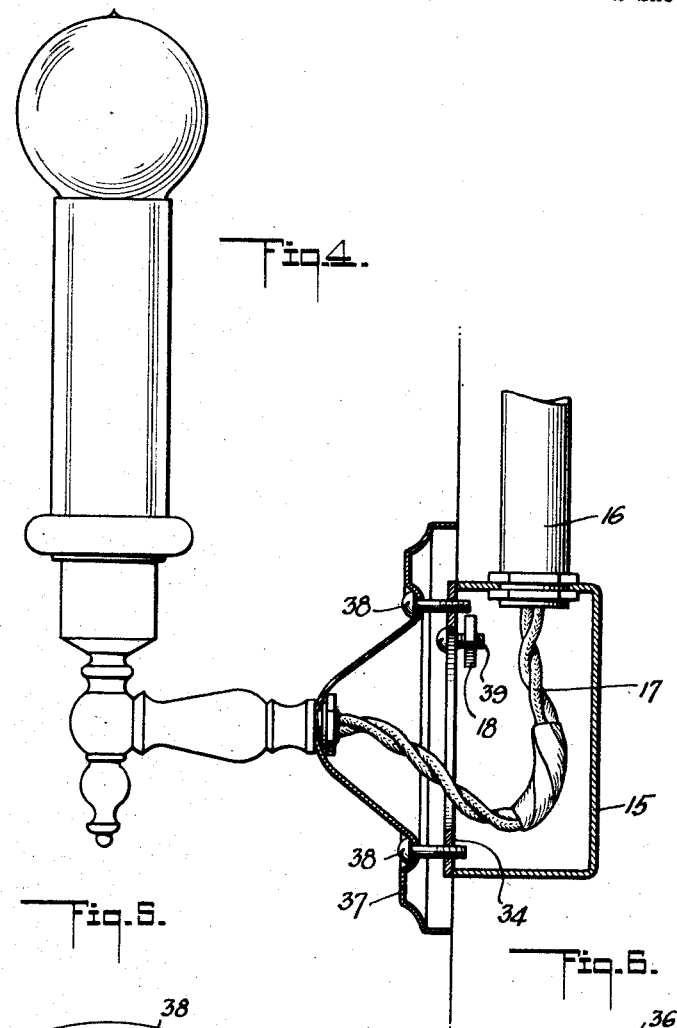
INVENTOR
JOHN LEE OEFINGER
BY Munn&Co.
ATTORNEYS Patented May 12, 1925.

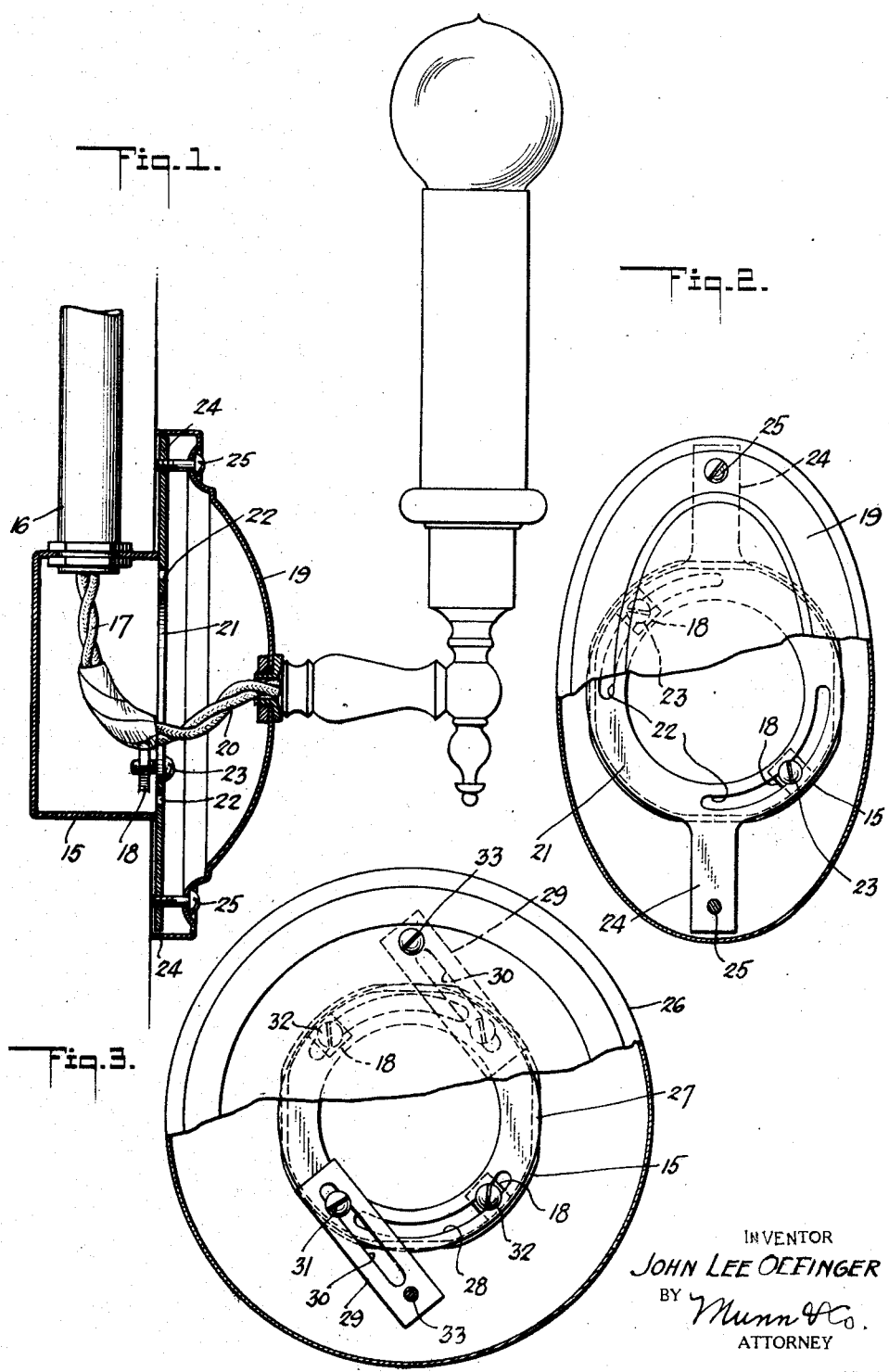

1,537,780

UNITED STATES PATENT OFFICE.

JOHN LEE OEFINGER, OF LOS ANGELES, CALIFORNIA.

ATTACHING BRACKET FOR LIGHTING FIXTURES.

Application filed December 8, 1923. Serial No. 679,408.

*To all whom it may concern:*

Be it known that I, JOHN LEE OEFINGER, a citizen of the United States, and a resident of Los Angeles, in the county of Los Angeles and State of California, have invented certain new and useful Improvements in Attaching Brackets for Lighting Fixtures, of which the following is a specification.

My invention relates to electrical lighting fixtures, and particularly, although not necessarily, to wall lighting fixtures.

In lighting fixtures for walls as heretofore proposed, brackets have been employed for detachably and adjustably securing the canopy or escutcheon plate to a junction box in such manner that the exposed screws or those extending through the canopy will occupy either a horizontal or vertical position so as not to detract from the symmetrical appearance of the entire fixture. These brackets are not only expensive but are so large as to fill the junction box to the extent that connecting of the conduit wires with the wires of the lighting fixture is rendered extremely difficult.

It is a purpose of my invention to provide an attaching bracket for lighting fixtures which, in addition to being extremely simple and inexpensive, can be readily attached to a junction box, and when attached does not occupy any space in the junction box so that ample room is provided to connect the conducting wires.

I will describe only three forms of attaching brackets embodying my invention and will then point out the novel features thereof in claims.

In the accompanying drawings—

Figure 1 is a view showing in vertical section one form of attaching bracket embodying my invention in applied position with respect to a junction box and lighting fixture;

Figure 2 is a view partly in elevation and partly in section of the attaching bracket and canopy shown in Figure 1;

Figure 3 is a view similar to Figure 2, showing another form of canopy and attaching bracket embodying my invention;

Figure 4 is a view similar to Figure 1, showing another form of lighting fixture and another form of attaching bracket embodying my invention in applied position thereto;

Figure 5 is a view showing in front elevation, and partly in section, the canopy and attaching bracket shown in Figure 4;

Figure 6 is a detail view of the attaching bracket shown in Figures 4 and 5.

Similar reference characters refer to similar parts in each of the several views.

Referring specifically to the drawings, and particularly to Figures 1 and 2, my invention in its present embodiment is shown as applied to a junction box 15 in proper position within a wall and communicating with a conduit 16, from which conductor wires 17 extend into the box. The junction box is of conventional form and includes lips or flanges 18 which extend inwardly from the inner periphery of the box and at diametrically opposed points. A conventional lighting fixture is shown in Figure 1, and such fixture includes a canopy or escutcheon plate 19 which is of ovate form and from which extend conducting wires 20 connected to the wires 17 at a point within the junction box 15.

The attaching bracket embodying my invention comprises in the present instance an annulus or flat ring 21 formed of suitable metal and provided with arcuate slots 22 through which extend screws 23 for securing the bracket as a unit to the lips or flanges 18. Arms 24 in the form of flat projections extend radially from the ring 21 and at diametrically opposed points, these arms being preferably formed integral with the ring and provided with threaded openings in which screws 25 are adapted to engage. The screws 25 extend through the canopy 19 and serve to secure the entire lighting fixture to the attaching bracket.

In practice, the screws 23 serve to secure the ring 21 in contiguous relation to the outer edge of the junction box, and as the periphery of the junction box is of substantially circular form, it can be said that the ring conforms to the contour of the periphery of the box.

In canopies of ovate form it is desirable that the screws 25 appear in vertical alinement so that the longitudinal axis of the canopy will likewise be vertical. In order to secure this result, when the lips or flanges 18 are in proper position it is only necessary to loosen the screws 23, thereby permitting circumferential adjustment of the ring 21 until the arms 24 are vertical, when the threaded openings thereof will register with the openings of the canopy to allow the application of the screws 25. It will be understood that after the ring has been circumferentially adjusted the screws 23 are tightened, thus securing the entire bracket in adjusted position.

With the attaching bracket applied as shown in Figure 1, it will be manifest that it fails to consume any of the space within the junction box so that ample room is provided to manipulate the wires 17 and 20 in effecting the connection thereof.

Referring now to Figure 3, I have here shown a circular form of canopy 26 in connection with which is employed an attaching bracket including a flat ring 27 having arcuate slots 28 and adjustable arms 29 provided with slots 30 through which screws 31 extend for securing the arms to the ring. Other screws 32 extend through the slots 28 to engage the lips or flanges 18 of the junction box 15 to secure the ring to the junction box and to allow circumferential adjustment of the ring. The arms 29 through the medium of the slots 30 and screws 31 are capable of longitudinal as well as lateral adjustment so as to properly position the outer ends to receive attaching screws 33 for the canopy 26 so that the screws 33 can be vertically alined as shown, or horizontally alined should it be desired. The extensibility of the arms 29 renders the bracket adjustable to accommodate canopies of various diameters which is a distinct advantage over the fixed arms 24 of the attaching bracket shown in Figures 1 and 2.

Referring now to Figures 4, 5 and 6, I have here shown another form of attaching bracket comprising a ring 34 having arcuate slots 35 and screw-receiving openings 36. This form of attaching bracket is adapted to be used in connection with a canopy 37 having attaching screws 38 spaced apart a distance corresponding to the distance between the openings 36 so that the screws can be extended through the openings, as shown in Figure 4, for securing the canopy to the bracket. The bracket in turn is secured to the junction box 15 by screws 39 engaging the lips 18, the screws extending through the slots 35 as in the other forms so as to allow circumferential adjustment of the bracket to properly position the attaching screws 38.

Although I have herein shown and described only three forms of attaching brackets each embodying my invention, it is to be understood that various changes and modifications may be made herein without departing from the spirit of the invention and the spirit and scope of the appended claims.

What I claim is:

1. An attaching bracket for lighting fixtures comprising a member having openings therein through which fastening members are adapted to extend for securing the member to a junction box in a manner to allow circumferential adjustment of the member on the box, arms having openings therein, and fastening members secured to the bracket and extending through the openings of said arms to allow adjustment of the arms on the brackets and to clamp the arms in any adjusted position.

2. In combination, a junction box, an attaching bracket for lighting fixtures which is continuously curved to conform generally to the contour of the periphery of the box and approximately of the same diameter, means for securing the bracket in concentric relation to the periphery of the box and to permit circumferential adjustment thereof, and arms on the bracket adapted to be secured to the canopy of the lighting fixture adjustable about axes parallel to the axis of the bracket and in planes parallel to the plane of the bracket.

3. In combination, a junction box, an attaching bracket for lighting fixtures which is continuously curved to conform generally to the contour of the periphery of the box and approximately of the same diameter, means for securing the bracket in concentric relation to the periphery of the box and to permit circumferential adjustment thereof, and arms adjustable tangentially on the bracket adapted to be secured to the canopy of the lighting fixture.

4. In a lighting fixture, a junction box having lips, a canopy, an attaching bracket having arcuate slots therein through which fastening members are adapted to extend for securing the bracket to the lips in a manner to permit circumferential adjustment of the bracket on the junction box, and arms on the bracket detachably secured to the canopy.

5. An attaching bracket for lighting fixtures comprising a member having arcuate slots therein through which fastening members are adapted to extend for securing the member to a junction box in a manner to allow circumferential adjustment of the member on the box, slotted arms, and fastening members secured to the bracket and extending through said slots to allow adjustment of the arms on the bracket and to clamp the arms in any adjusted position.

6. In combination, a junction box having projections thereon, a bracket having openings therein, fastening members secured in the projections and extending into the openings in a manner to permit circumferential adjustment of the bracket on the junction box and to secure the bracket in any adjusted position, arms having openings therein, and fastening members secured in the bracket and extending into the openings to permit adjustment of the arms on the bracket and to secure the arms in any adjusted position.

JOHN LEE OEFINGER.